United States Patent
Kanazawa et al.

[11] Patent Number: 6,032,115
[45] Date of Patent: Feb. 29, 2000

[54] APPARATUS AND METHOD FOR CORRECTING THE DIFFERENCE IN FREQUENCY CHARACTERISTICS BETWEEN MICROPHONES FOR ANALYZING SPEECH AND FOR CREATING A RECOGNITION DICTIONARY

[75] Inventors: Hiroshi Kanazawa; Takehiko Isaka; Yoshifumi Nagata, all of Hyogo-ken; Hiroyuki Tsuboi, Kanagawa-ken, all of Japan

[73] Assignee: Kabushiki Kaisha Toshiba, Kawasaki, Japan

[21] Appl. No.: 08/935,082

[22] Filed: Sep. 26, 1997

[30] Foreign Application Priority Data

Sep. 30, 1996 [JP] Japan .................................... 8-259967

[51] Int. Cl.[7] ...................................................... G10L 7/08
[52] U.S. Cl. .......................................... 704/234; 704/244
[58] Field of Search .................................... 704/244, 248, 704/233, 253, 224, 231, 234, 243, 245, 200

[56] References Cited

U.S. PATENT DOCUMENTS

| | | | |
|---|---|---|---|
| 4,631,749 | 12/1986 | Rapaich | 381/103 |
| 4,847,885 | 7/1989 | Vittorelli | 379/6 |
| 5,402,669 | 4/1995 | Pla et al. | 731/1.59 |
| 5,459,792 | 10/1995 | Reichel et al. | 381/111 |
| 5,528,731 | 6/1996 | Sachs et al. | 704/246 |
| 5,950,157 | 9/1999 | Heck et al. | 704/234 |

FOREIGN PATENT DOCUMENTS 7-84594  3/1995  Japan .

OTHER PUBLICATIONS

A. Acero and R. M. Stern, "Enviromental Robustness in Automatic Speech Recognition", Acoustics, Speech, and Signal Processing, 1990, ICASSP–90., 1990 International Conference on, Apr. 3–6, 1990, vol. 2, pp. 849–852.

J. N. Holmes, "Speech Synthesis and Recognition," Chapman and Hall (London, 1988), pp. 103–128.

Richard M. Stern nd Alejandro Acero, "Acoustical Pre–Processing for Robust Speech Recognition," Proc. DARPA Speech and Natural Language Workshop, Oct. 1989, pp. 311–318.

*Primary Examiner*—David R. Hudspeth
*Assistant Examiner*—Donald L. Storm
*Attorney, Agent, or Firm*—Finnegan, Henderson, Farabow, Garrett & Dunner, L.L.P.

[57] ABSTRACT

In sound recognition apparatus of the present invention, user's utterance or a sound provided by an output section using previously stored sound waveforms is simultaneously inputted through a basic microphone of known frequency characteristics and an input microphone of unknown frequency characteristics. An analysis section respectively analyzes the frequency of the input speech through the basic microphone and the input microphone. A frequency characteristics calculation section calculates first difference data between the frequencies of the input speech of the basic microphone and the input microphone, and calculates frequency characteristics of the input microphone according to the first difference data and the frequency characteristics of the basic microphone. A frequency characteristics correction section calculates second difference data between the frequency characteristics of the input microphone and known frequency characteristics of a dictionary data microphone, and corrects input speech to be recognized through the input microphone as speech data of the frequency characteristics of the dictionary data microphone according to the second difference data. A recognition section recognizes corrected speech data by referring to a recognition dictionary storing data previously created through the dictionary data microphone.

11 Claims, 9 Drawing Sheets

| ⊙ | A COMPANY | SINGLE DIRECTIONAL MICROPHONE (STYLE NUMBER A1, A2) |
| ○ | B COMPANY | NON DIRECTIONAL MICROPHONE (STYLE NUMBER B1, B2, B3) |
| ○ | C COMPANY | SINGLE DIRECTIONAL MICROPHONE (STYLE NUMBER C1, C4) |
| ○ | E COMPANY | NON DIRECTIONAL MICROPHONE (STYLE NUMBER C2, C3) |
| ○ | OTHER | |

[OK] [CANCEL] [DETAIL]

*FIG. 7*

"CHARACTERISTICS OF MICROPHONE
TO BE USED IS MEASURED."

PREVIOUS | NEXT | CANCEL

*FIG. 8A*

"PLEASE SET THE MICROPHONE
TO YOUR POSITION OF USE.
PLEASE STAY IN FRONT OF MONITOR."

PREVIOUS | NEXT | CANCEL

*FIG. 8B*

"PLEASE REPEAT THE FOLLOWING
WORD."

81 — SOUND

NUMBER OF WORD
82 — 1

PREVIOUS | NEXT | CANCEL

*FIG. 8C*

APPARATUS AND METHOD FOR CORRECTING THE DIFFERENCE IN FREQUENCY CHARACTERISTICS BETWEEN MICROPHONES FOR ANALYZING SPEECH AND FOR CREATING A RECOGNITION DICTIONARY

FIELD OF THE INVENTION

The present invention relates to a sound recognition apparatus and a method to effectively change a microphone's frequency characteristic to correctly recognize a user's voice.

BACKGROUND OF THE INVENTION

In a sound recognition apparatus of the prior art, in order to increase the similarity between a user's input speech and a standard speech pattern of a recognition dictionary for same category, elements of various kinds of pattern transformations are excluded for the input speech and many kinds of pattern transformations are included in the standard pattern of the recognition dictionary.

As for the input sound, in order to exclude the pattern transformations speech based on noise, various kinds of methods are used. In a first method (the noise subtraction method), the frequency parameter of noise is estimated and the noise element is eliminated from the frequency parameter of the noisy speech. In a second method, frequency characteristics of the lines are approximated by a secondary curve in order to normalize differences of lines frequency characteristics, and the frequency characteristics are corrected for the input speech. In a third method for telephone speech recognition, in order to normalize distortion of the telephone line, the frequency characteristics are corrected using a filter, and the spectrum is flattered to eliminate the distortion of the telephone line.

On the other hand, as for the recognition dictionary, various methods are considered. In a first method, as for the contaminated noise, the speech pattern contaminated by the noise pattern is artificially generated, and the recognition dictionary is created using that speech pattern. In a second method, a plurality of recognition dictionaries are created by units of different signal to noise ratios (S/N). The S/N of the input speech is estimated and one recognition dictionary whose S/N is close to the S/N of the input speech is used. In a third method, the HMM (Hidden Markov Model) is used as the recognition dictionary. The HMM parameter of the contamineted noise speech is synthesized by the HMM parameter of the clear speech and the HMM parameter of the noise.

As for correction of the frequency characteristics of the microphone for the input speech, one method is disclosed in Japanese Patent Disclosure (Kokai) PH7-84594. In this method, a first microphone to input the speech to be recognized, and a second microphone to gather speech data to create the recognition dictionary are prepared. The sound of the user's voice is inputted through the first microphone and the second microphone at same time. The coefficient of the adaptive filter is estimated using respective speech data so that the characteristic of the first microphone is equal to the characteristic of the second microphone. In case of actual recognition, the input speech is corrected by an estimated filter.

As for correction of microphone characteristics and circuit characteristics for the input speech, the frequency characteristics are calculated beforehand by a test signal such as white noise. In case of actual recognition, the frequency parameter of the input speech is changed by correction data of the frequency characteristics. Alternatively, the frequency characteristics are estimated from the actual input speech by an approximation method, and the input speech is corrected using estimated characteristics.

However, in the case where the correction data is calculated beforehand, a microphone used for inputting a user's voice on recognition mode is previously determined. Therefore, if the user selects his desired microphone according to a particular use environment, the frequency characteristics will not be suitably corrected. In case the frequency characteristics are estimated from the input speech, the characteristics are not estimated exactly, and corrected only approximately. Even if the input speech is corrected, it is different from the microphone characteristics used for creating the recognition dictionary and high recognition accuracy is not obtained.

Furthermore, in the method disclosed in PH7-84594 mentioned-above, in case of correcting the input speech, the second microphone used to create the recognition dictionary is necessarily used. However, in general, the second microphone used to gather speech data for creating the recognition dictionary is expensive or differs for each task. Therefore, in order to correct the frequency characteristics of microphone suitably, the user's expense increases.

SUMMARY OF THE INVENTION

It is an object of the present invention to provide a sound recognition apparatus and a method which is able to correct the difference of frequency characteristics between a microphone used for inputting a user's voice and a microphone used for creating a recognition dictionary in order to correctly recognize the user's voice.

According to the present invention, there is provided a sound recognition apparatus, comprising: an input means for synchronously inputting a user's voice through a basic microphone of known frequency characteristics and an input microphone of unknown frequency characteristics; an analysis means for respectively analyzing the frequency of the input speech through the basic microphone and the input microphone; a frequency characteristics measurement means for calculating a first difference data of frequency of the input speech between the basic microphone and the input microphone, and for calculating the frequency characteristics of the input microphone according to the first difference data and the frequency characteristics of the basic microphone; a frequency characteristics correction means for calculating a second difference data of the frequency characteristics between the input microphone and the dictionary data microphone which collects data for creating a recognition dictionary whose frequency characteristics is known, and for correcting the input speech to be recognized through the input microphone using the second difference data; and a recognition means for recognizing the corrected speech data by referring to the recognition dictionary storing data previously created using speech data through the dictionary data microphone.

Further in accordance with the present invention, there is provided a sound recognition apparatus, comprising: an input means for synchronously inputting the stored sound which is collected previously through a basic microphone of known frequency characteristics and an input microphone of unknown frequency characteristics; an analysis means for respectively analyzing frequency of the input sound through the basic microphone and the input microphone; a frequency characteristics measurement means for calculating first difference data of frequency of the input sound between the basic microphone and the input microphone, and for calculating frequency characteristics of the input microphone according to the first difference data and the frequency characteristics of the basic microphone; frequency characteristics correction means for calculating a second difference data of the frequency characteristics between the input microphone and the dictionary data microphone which collects data for creating a recognition dictionary whose frequency characteristics is known, and for correcting the input sound to be recognized through the input microphone using the second difference data; and a recognition means for recognizing the corrected sound data by referring to the recognition dictionary storing data previously created using sound data through the dictionary data microphone.

Further in accordance with the present invention, there is provided a sound recognition apparatus, comprising: a frequency characteristics memory for previously storing frequency characteristics for plural kinds of input microphones; a user interface means for receiving a user's indication to select one frequency characteristic stored in said frequency characteristics memory as the frequency characteristic of a corresponding input microphone; a frequency characteristics selection means for selecting the one frequency characteristics from said frequency characteristics memory according to the user's indication; a frequency characteristics correction means for calculating difference of the data between the frequency characteristics selected by said frequency characteristics selection means and the dictionary data microphone which collects data for creating a recognition dictionary whose frequency characteristics is known, and for correcting the input speech to be recognized through the corresponding input microphone using the different data; and a recognition means for recognizing the corrected speech data by referring to the recognition dictionary storing data previously created using speech data through the dictionary data microphone.

Further in accordance with the present invention, there is provided a sound recognition apparatus, comprising: a correction data memory for previously storing a plurality of correction data to respectively correct frequency characteristics of plural kinds of input microphones to frequency characteristics of a dictionary data microphone which collects data for creating a recognition dictionary whose frequency characteristics is known; a user interface means for receiving a user's indication to select one correction data stored in said correction data memory as the correction data of frequency characteristics of the corresponding input microphone; a correction data selection means for selecting the one correction data from said correction data memory means according to a user's indication; a frequency characteristics correction means for correcting the frequency characteristics of the input speech from the corresponding input microphone to the frequency characteristics of the dictionary data microphone according to the correction data selected by said correction data selection means; and a recognition means for recognizing corrected speech data by referring to recognition dictionary storing data previously created using speech data through the dictionary data microphone.

BRIEF DESCRIPTION OF THE DRAWINGS

FIG. 7 is a schematic diagram of a menu screen to select a microphone used for the sound recognition apparatus.

FIGS. 8A, 8B, 8C are schematic diagrams of a guidance screen for the user in case the menu item "OTHER" is selected in the menu screen shown in FIG. 7.

DETAILED DESCRIPTION OF THE PREFERRED EMBODIMENTS

Figure 1:
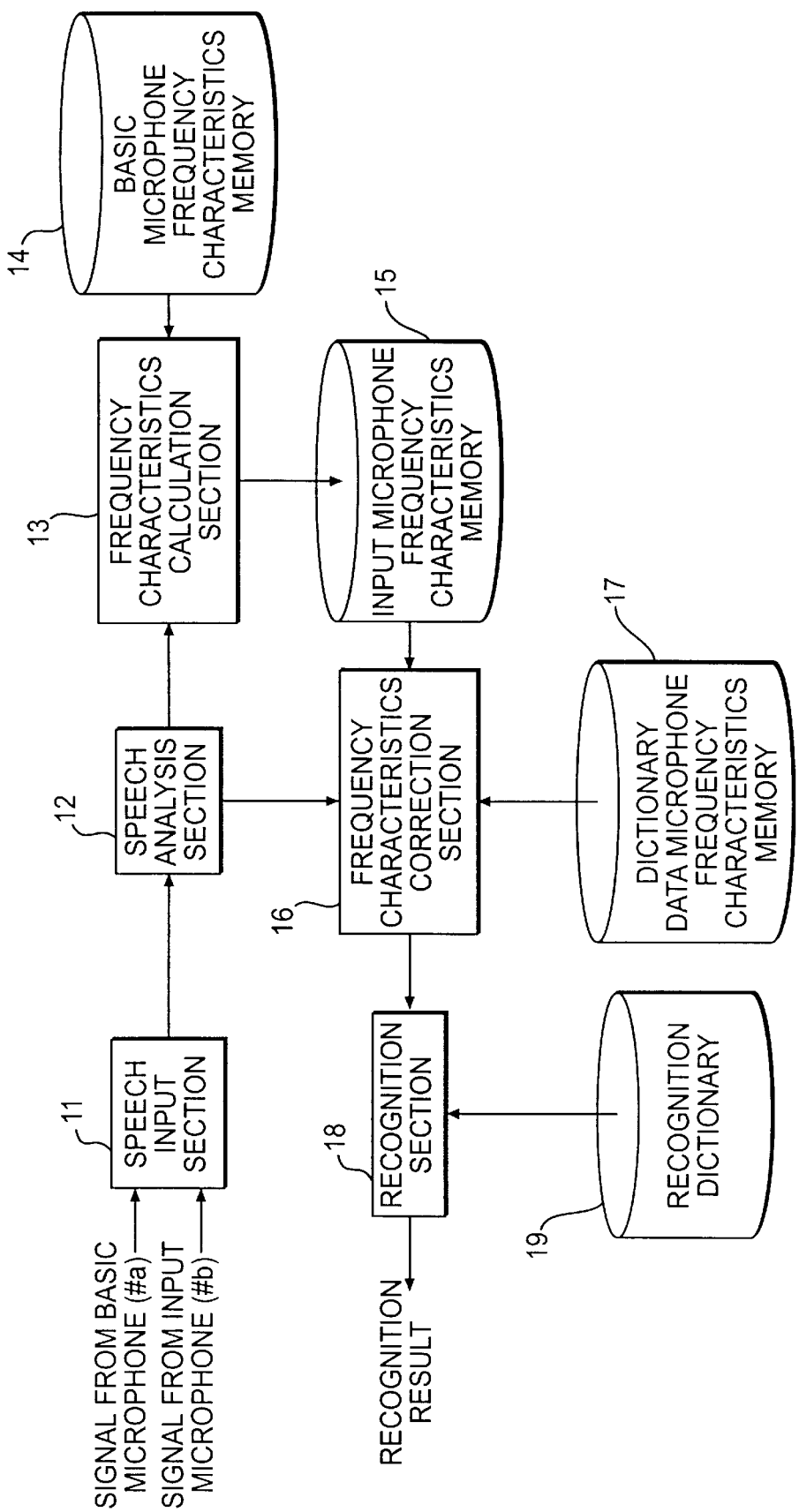
FIG. 1 is a block diagram of the sound recognition apparatus according to a first embodiment of the present invention.
Figure 2:
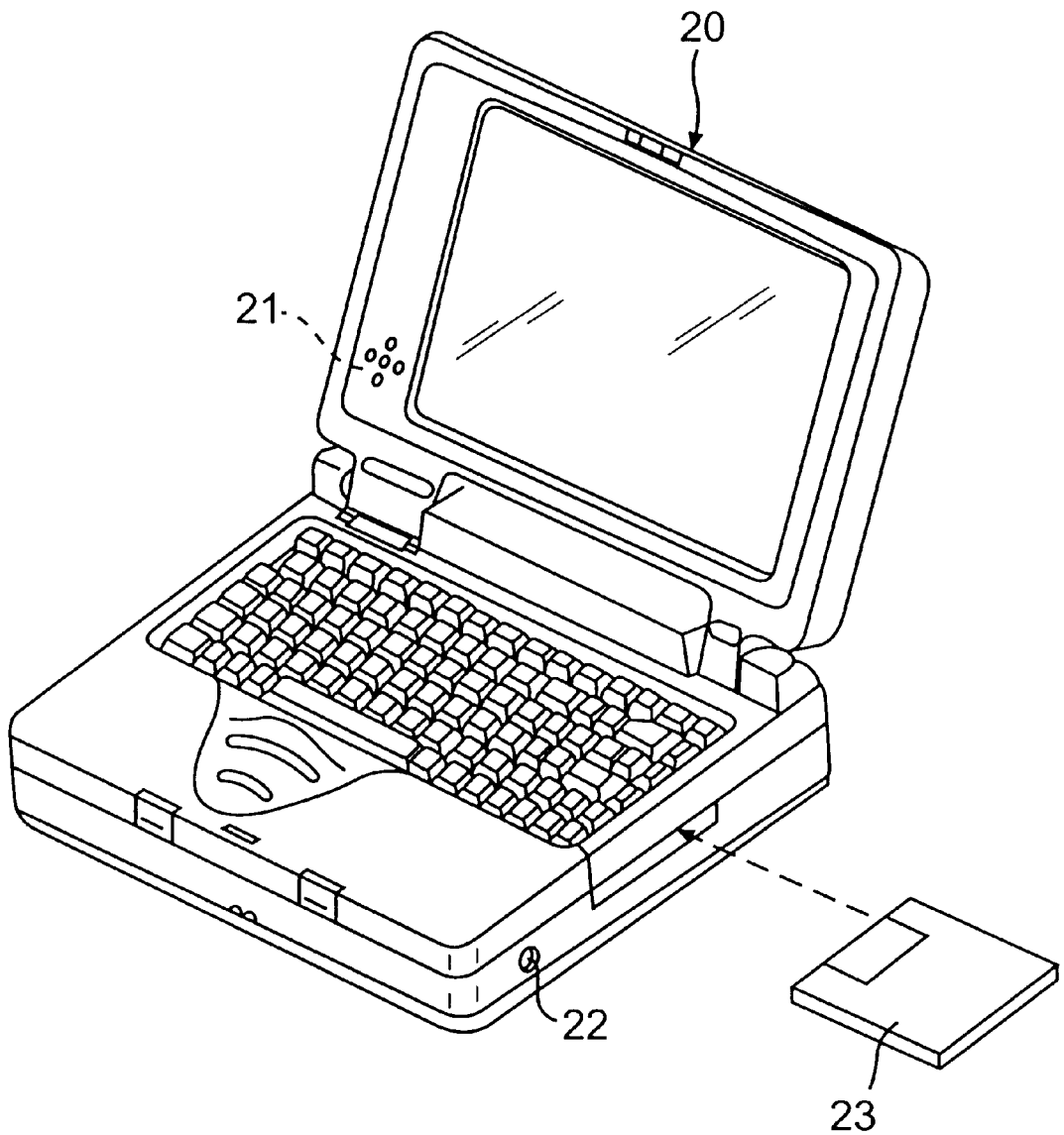
FIG. 2 is a schematic diagram of personal computer including the function of the sound recognition apparatus.

FIG. 1 is a block diagram of a sound recognition apparatus according to the first embodiment of the present invention. As shown in FIG. 1, the sound recognition apparatus includes a speech input section 11, a speech analysis section 12, a frequency characteristics calculation section 13, a frequency characteristics memory of a basic microphone 14, a frequency characteristics memory of an input microphone 15, a frequency characteristics correction section 16, a frequency characteristics memory of a microphone in which data are collected for generating dictionary 17, a recognition section 18, and a recognition dictionary 19. FIG. 2 is a schematic diagram of a personal computer 20 configured and programed to realize the functions of the sound recognition apparatus in FIG. 1. In FIG. 2, a built-in microphone 21 is installed in the personal computer 20. A microphone input terminal 22 connectable to a microphone is installed in the personal computer 20. Furthermore, sound input apparatus for stereo recording (not shown in FIG. 2) is stored in the personal computer 20. The sound recognition apparatus shown in FIG. 1 is activated by two modes, i.e., (1) a frequency characteristics measurement mode of an input microphone, and (2) a recognition mode. The two modes are selectively indicated by an input means such as a keyboard or a mouse. A user interface to receive the user's indication is omitted in FIG. 1.

Figure 3:
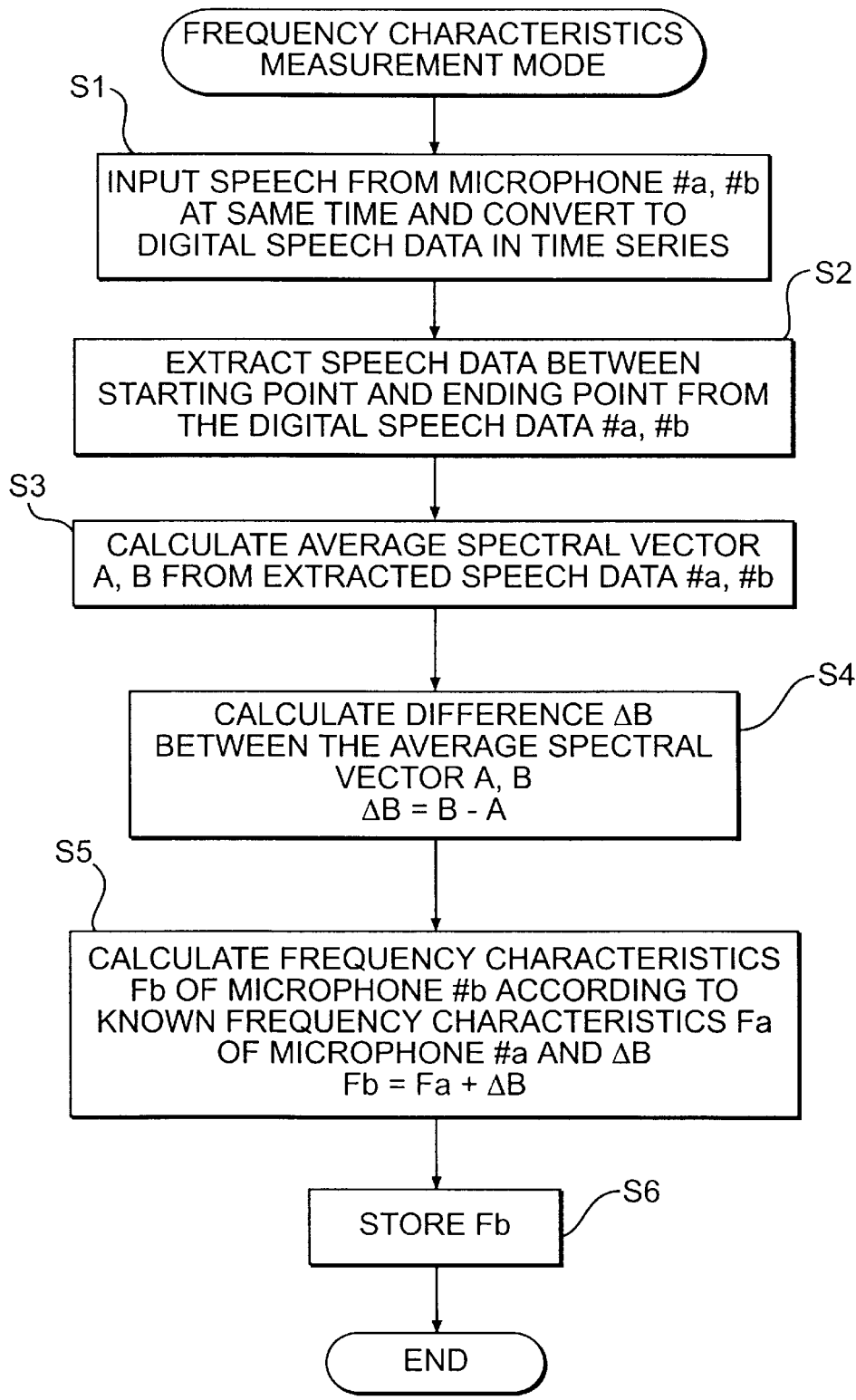
FIG. 3 is a flow chart of processing of the frequency characteristic calculation mode according to the present invention.

First, the processing of the frequency characteristics measurement mode (1) of the sound recognition apparatus according to the present invention is explained. FIG. 3 is a flow chart of the processing of the frequency characteristics measurement mode of the present invention. In the frequency characteristics measurement mode of the microphone to input the user's voice to be recognized, the speech input section 11 simultaneously inputs the user's voice through a basic microphone #a of known frequency characteristics and an input microphone #b of unknown frequency characteristics (S1). The speech input section 11 respectively converts the input speech signal from the basic microphone #a and the input microphone #b to digital speech signals in a time series (A/D conversion). These digital speech signals are stored in memory (not shown in Fig.) in order of the time series. In the A/D conversion of the speech input section 11, the speech input apparatus of the stereo recording stored in the personal computer 20 is used. As the basic microphone #a of known frequency characteristics, the stored microphone 21 installed in the personal computer 20 is used in FIG. 2. In case the speech recognition apparatus in FIG. 1 is realized as a desktop personal computer, a microphone attached to the computer as an accessary may be used. In short, the basic microphone #a is usable without a user's special preparation, and the frequency characteristics is previously known.

On the other hand, as for the input microphone #b of unknown frequency characteristics, a free microphone from the user can be used. In FIG. 2, the input microphone #b is connected to the microphone input terminal 22 in the personal computer 20.

The speech input section 11 respectively calculates speech power by fixed period of time (for example, 8 mm sec: this period is called a "frame" hereinafter) from the input speech data through the basic microphone #a and the input microphone #b, and extracts timings of a start point and an end point from the speech power (S2). In step S2, the speech input section 11 respectively extracts speech data between the start point and the end point of the input speech data through the basic microphone #a and the input microphone #b. The extracted speech data from the basic microphone #a and the input microphone #b is supplied to the speech analysis section 12.

The speech analysis section 12 respectively analyzes the extracted speech data of microphones #a and #b by fast Fourier transform (FFT). The speech data in the time series is converted to frequency parameter data in the time series (S3). In step S3, the speech analysis section 12 calculates the average and logarithm for the frequency parameter data of microphones #a and #b, and generates average spectral vectors A and B of the microphones #a and #b, respectively, as follows. In this case, when plural kinds of word are inputted through the microphones #a and #b, average is calculated for the speeches of all input words.

$A=(a1, a2, a3, \ldots, a256)$: the average spectral vector of the basic microphone #a $B=(b1, b2, b3, \ldots, b256)$: the average spectral vector of the input microphone #b The average spectral vectors A and B are examples of FFT of 512 points ("1, 2, 3 . . . " are numbers of each frequency band).

The frequency characteristics calculation section 13 calculates the unknown frequency characteristics Fb of the input microphone #b according to the average of the spectral vectors A and B and the known frequency characteristics Fa of the basic microphone #a. In this case, the frequency characteristics Fa of the basic microphone #a is previously stored in the basic microphone frequency characteristics memory 14. First, the frequency characteristics calculation section 13 calculates a difference vector ΔB between the average spectral vector A of the basic microphone #a and the average spectral vector B of the input microphone #b as follows (S4).

$\Delta B = B - A = (b1-a1, b2-a2, b3-a3 \ldots, b256-a256)$

By calculating ΔB, common features such as the speaker's feature, phoneme feature of speaking content, and circuit distortion offset each other.

Next, assume that the frequency characteristics Fa of the basic microphone #a is as follows.

$Fa = (fa1, fa2, fa3, \ldots, fa256)$

In this case, the frequency characteristics calculation section 13 calculates the frequency characteristics Fb of the input microphone #b according to the frequency characteristics Fa and ΔB as follows (S5).

$Fb = Fa + \Delta B = (fa1+(b1-a1), fa2+(b2-a2), \ldots, fa256+(b256-a256))$

The frequency characteristics Fb of the input microphone #b are stored in the input microphone frequency characteristics memory 15 (S6). In this case, assume that common features such as the speaker's feature, phoneme feature of speaking content, and environmental feature are represented as X. The relations between the average spectral vectors A and B and the frequency characteristics Fa and Fb of the microphone #a, #b are represented as follows.

$A = Fa + X$ $B = Fb + X$ $\Delta B = B - A = (Fb+X) - (Fa+X) = Fb - Fa$

In the above equation, even if the speaking content, the speaker, and the speaking environment are different, a difference between the average spectral vector A of the microphone #a and the average spectral vector B of the microphone #b is represented as ΔB.

The above-mentioned processing is that of the frequency characteristics measurement mode of the input microphone (estimation processing of the frequency characteristics). In this mode, it is possible to indicate the vocabulary which should be uttered for estimating frequency characteristics. Especially, the vocabulary, in which each phoneme appears at the same frequency, should be selected.

Figure 4:
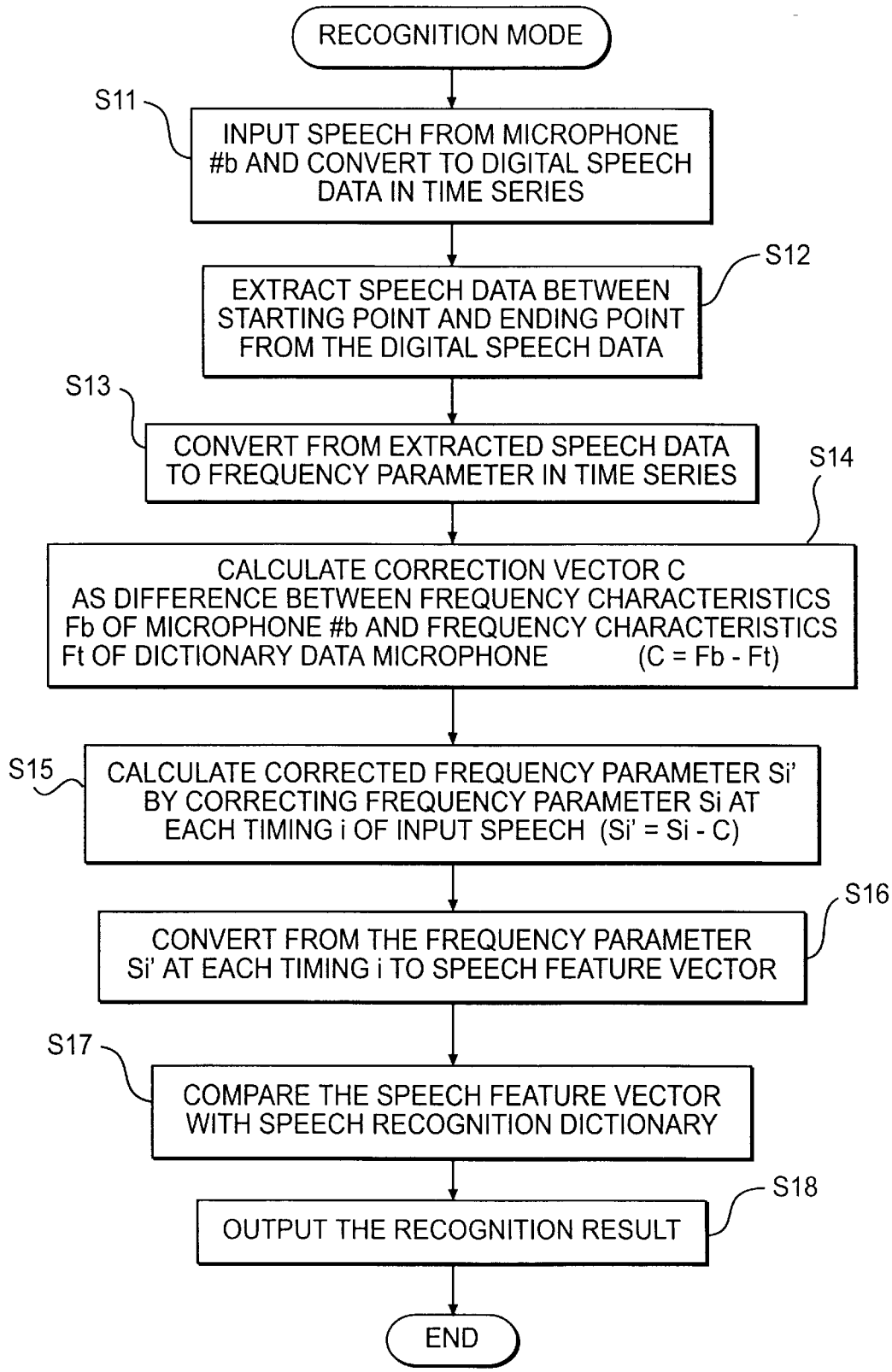
FIG. 4 is a flow chart of the processing of a recognition mode according to the present invention.

Next, the processing of the recognition mode of the first embodiment of the present invention is explained. FIG. 4 is a flow chart of the processing of the recognition mode according to the first embodiment. In the recognition mode, the user's voice is inputted through input microphone #b by the speech input section 11 and converted to digital data in a time series in the same way as in the first embodiment (S11). A starting point and an ending point are detected according to the power of the digital speech signal, and sound data between the starting point and the ending point is extracted (S12). The extracted speech data is analyzed by the speech analysis section 12 and converted to the spectrum data in time series (S13). The spectrum data is supplied to the frequency characteristics correction section 16. The frequency characteristics correction section 16 corrects the spectrum data of the input microphone #b to the frequency characteristics of a microphone used to collect speech data to create the recognition dictionary as follows (This microphone is called a "dictionary data microphone" hereinafter). First, the frequency characteristics correction section 16 calculates difference between the frequency characteristics Fb of the input microphone #b stored in the input microphone frequency characteristics memory 15 and the frequency characteristics Ft of the dictionary data microphone in order to calculate the correction vector C (S14). The frequency characteristics Ft of the dictionary data microphone is previously stored in the dictionary data microphone frequency characteristics memory 17. Assume that the frequency characteristics Ft are represented as follows.

$Ft = (ft1, ft2, ft3, \ldots, ft256)$

In this case, the correction vector C is represented as follows.

$C = Fb - Ft = (fa1+(b1-a1)-ft1, fa2+(b2-a2)-ft2, \ldots, fa256+(b256-a256)-ft256)$ The correction vector C is calculated at a predetermined stage that the frequency characteristics Fb of the input microphone #b is estimated. Accordingly, if the correction vector C is calculated at this stage and stored in the input microphone frequency characteristics memory 15, the calculation step (S14) of the correction vector C is not necessary for every recognition processing.

After calculation of the correction vector C, the frequency characteristics correction section 16 corrects the frequency parameter Si of the input speech for each frame i using the correction vector C (S15). Assume that the frequency parameter Si is represented as follows.

Si=(Si1, Si2, Si3, . . . , Si256)

In this case, the corrected frequency parameter Si' is calculated by the frequency parameter Si and the correction vector C as follows.

$$Si'=Si-C=(Si1-fa1-(b1-a1)+ft1, Si2-fa2-(b2-a2)+ft2, \ldots, Si256-fa256-(b256-a256)+ft256)$$

In the above equation, the correction vector C is used for conversion from the frequency parameter Si to frequency parameter Si'.

Next, the frequency characteristics correction section 16 converts the corrected frequency parameter Si' to the speech feature vector to be recognized (S16). The detailed processing of this step (S16) is explained in case the output of the bandpass filter as the speech feature vector.

As for the frequency parameter Si', the frequency characteristics correction section 16 converts from a logarithmic scale to a linear scale as an exponential conversion. Next, the frequency characteristics conversion section 16 compresses the vector of the frequency parameter Si' to the low dimensional vector of the speech feature parameter using Bark scale etc.

The recognition section 18 compares the speech feature vector with the speech recognition dictionary 19 (S17) and outputs the word whose similarity is the highest among the recognition words (S18). As the speech recognition dictionary, the average vector pattern created by plural data belonging to same category or HMM (Hidden Markov Model) as statistic method is used. As a comparison method, DP (Dynamic Programming) is used.

Each processing of the sound recognition apparatus in FIG. 1, i.e., the processing of the frequency characteristic measurement mode of the input microphone (the speech input section 11, the speech analysis section 12, and the frequency characteristics calculation section 13) and the processing of the recognition mode (the speech input section 11, the speech analysis section 12, the frequency characteristics correction section 16, and the recognition section 18) are executed by recording a media storing program. For example, in FIG. 2, a Floppy Disk 23 as the recording media is loaded to the personal computer 20 and the stored program is executed by the personal computer 20.

Figure 5:
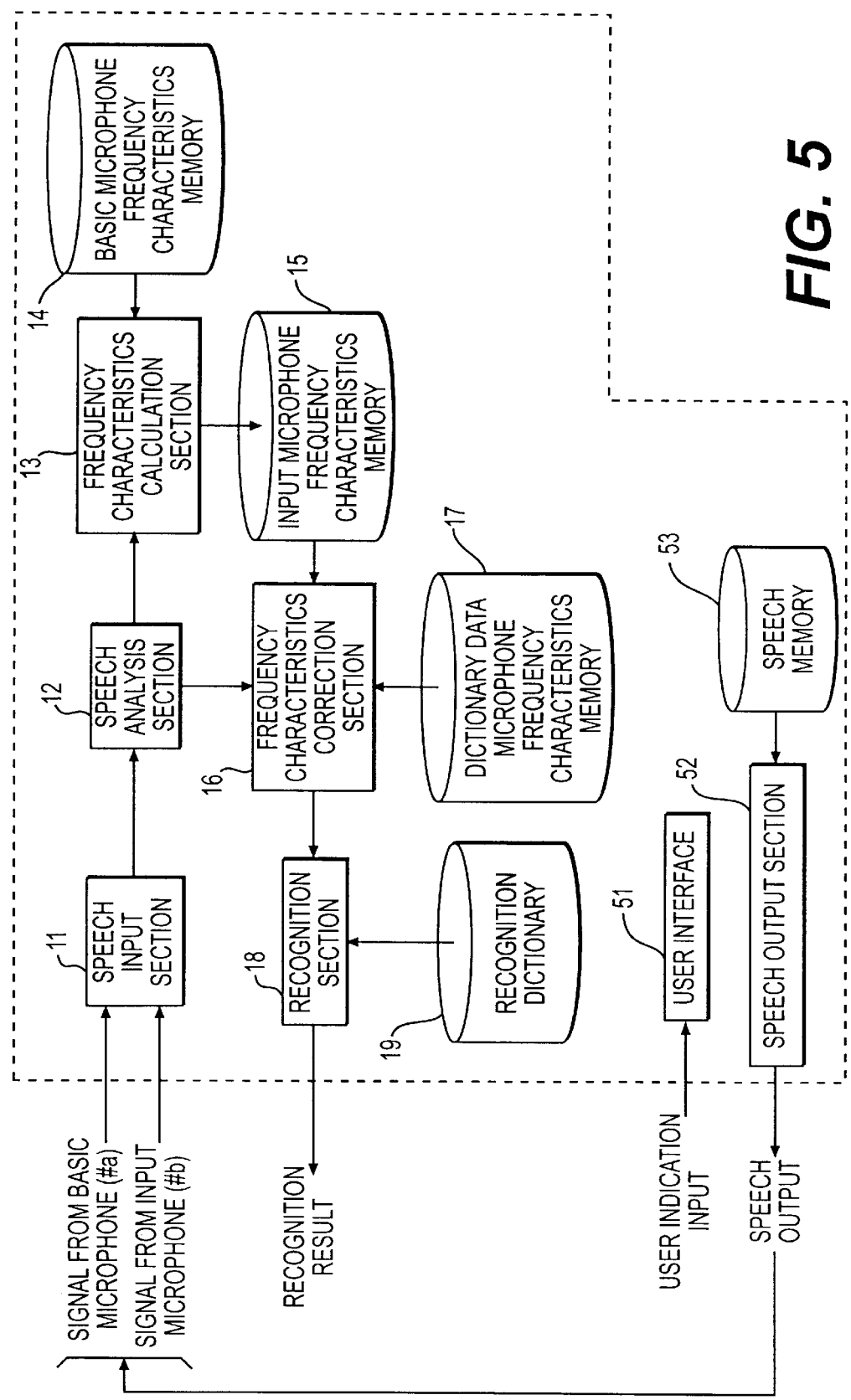
FIG. 5 is a block diagram of the sound recognition apparatus according to a second embodiment of the present invention.

In the first embodiment, the user must speak various words in the frequency characteristic measurement mode of the input microphone. Therefore, a second embodiment in which the user's utterance is unnecessary is explained. FIG. 5 is a block diagram of the sound recognition apparatus according to the second embodiment. A specific feature of the second embodiment that differs from the first embodiment is that a prepared speech signal is used instead of a user's voice in the frequency characteristics measurement mode. In FIG. 5, a user interface 51 to receive a user's indication to select a speech signal, a sound output section 52 to output speech in case of receiving the user's indication, and a speech memory 53 to previously store a speech wave, are newly prepared as the sound recognition apparatus. The user interface 51 further receives a mode selection from the user.

In the sound recognition apparatus in FIG. 5, when the user selects the frequency characteristics measurement mode and indicates the sound output, the user interface 51 activates the sound output section 52. The sound output section 52 reads out the sound wave from the sound memory 53 and generates the sound output according to the sound wave. In this case, the sound wave may be noise or speech. It is necessary that various kinds of frequency elements are included in the sound wave in order to measure the frequency characteristics of the input microphone. Therefore, white noise or speech including many kinds of phoneme is better as the sound wave.

The sound input section 11 synchronously inputs the sound outputted by the sound output section 52 through both the basic microphone #a with known frequency characteristics and the input microphone #b with unknown frequency characteristics. The input sound from microphones #a and #b is converted to digital sound data in time series. The processing of the sound input section 11 is the same as step S1 of the first embodiment except for the sound from the sound output section 52. The sound input apparatus of the stereo recording stored in the personal computer 20 in FIG. 2 is used as A/D conversion. As the basic microphone #a, the stored microphone 21 in the personal computer 20 in FIG. 2 is used. In case the sound recognition apparatus is realized by desktop personal computer, a microphone attached to the computer as an accessary is used. In short, the basic microphone #a is a microphone whose frequency characteristics are previously measured without a user's special preparation. As the input microphone #b, a recognition microphone to be prepared by the user is used. For example, in FIG. 2, this microphone may be connected to the microphone input terminal 22 of the personal computer 20. The processing of extracting sound data between the start point and the end point from the input sound is the same as step S2 of the first embodiment. The processing of calculating the frequency characteristic Fb of the input microphone #b (the sound analysis section 12 and the feature characteristics calculation section 13) is the same as steps S3~S6 of the first embodiment. The processing of the recognition mode (the sound input section 11, the sound analysis section 12, the frequency characteristics correction section 16, and the recognition section 18) is the same as steps S11~S18 of the first embodiment.

In the first and second embodiments, the frequency characteristics of the input microphone is measured in the sound recognition apparatus. In the frequency characteristics measurement mode, it is necessary that the sound is synchronously inputted through each microphone #a and #b, and the frequency characteristics Fb of the input microphone #b is calculated according to the input sound. Therefore, the third embodiment as an improvement of the frequency characteristics measurement mode is explained.

Figure 6:
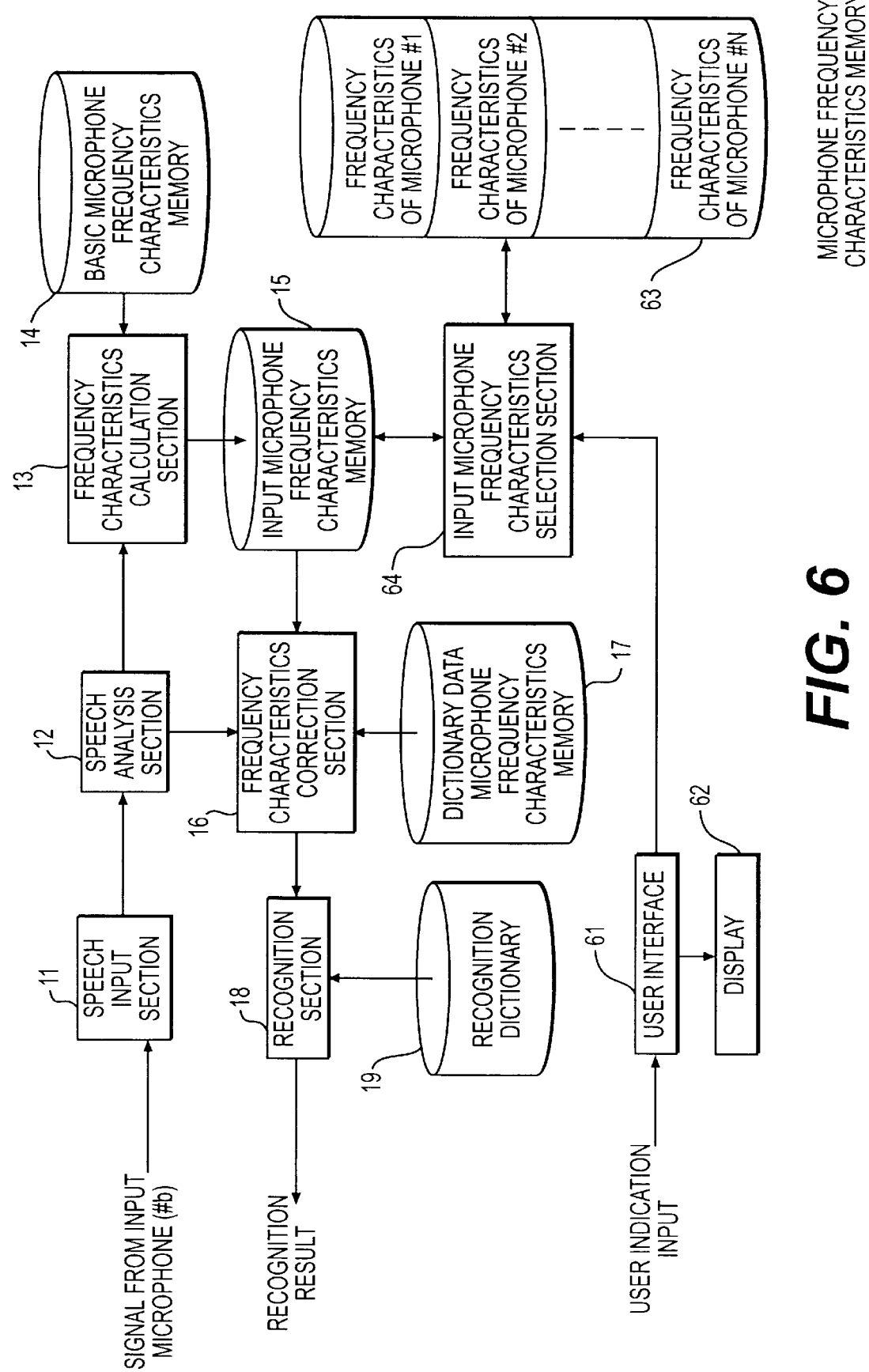
FIG. 6 is a block diagram of the sound recognition apparatus according to a third embodiment of the present invention.

FIG. 6 is a block diagram of the sound recognition apparatus according to the third embodiment. Specific features of the third embodiment that differ from the first embodiment are a user interface 61 to receive user's selection of the microphone characteristics, a display 62 to output a menu screen to select the microphone characteristics, a microphone frequency characteristics memory 63 to store various kinds of microphone characteristics, and an input microphone frequency characteristics selection section 64 to select the microphone characteristics from the microphone frequency characteristics memory 63 and to store the selected microphone characteristics in the input microphone frequency characteristics memory 15.

Now, the interface function for the user to select the microphone characteristics is explained. First, a menu screen to select the microphone characteristics appears on the display shown in FIG. 7. In FIG. 7, five predetermined selection items—four microphones and one other item—are displayed as a menu. The user knows the company name and product number of the input microphone #b. Accordingly, if a corresponding microphone is displayed as a menu item, he selects it using an input means such as a mouse. When the user selects the microphone characteristics from the menu screen, the user interface 61 activates the input microphone frequency characteristics selection section 64. The input microphone frequency characteristics selection section 64 reads out the frequency characteristics of the selected microphone from the microphone frequency characteristics memory 63 and stores them in the input microphone frequency characteristics memory 15 as the frequency characteristics Fb of the input microphone #b.

In this way, in the third embodiment, menu items of plural microphones used by the user are displayed as the menu screen shown in FIG. 7. Therefore, if the user selects his desired microphone item, the frequency characteristics Fb of the input microphone #b is stored in the input microphone frequency characteristics memory 15 without the user's utterance or processing of the frequency characteristics measurement mode. The frequency characteristics Fb stored in the input microphone frequency memory 15 are used to correct the speech from the input microphone #b in the recognition mode in same way as the first embodiment.

On the other hand, if the user can not decide the menu item of the input microphone #b by displaying the company name and the style number, he clicks the "DETAIL" button on right power side of the screen in FIG. 7. In this case, the display 62 outputs detail information such as the outward form, size, and frequency characteristics of the microphone. Furthermore, if the user can not decide the kind of the microphone during display of the detail information, he clicks menu item "OTHER" to indicate the non-existence of his desired microphone in FIG. 7. When the menu item "OTHER" is selected on the menu screen, the user interface 61 automatically sets the frequency characteristics measurement mode in the same way as in the first embodiment. In this case, the user interface 61 outputs a guidance screen to begin measurement of the frequency characteristics through the display 62 as shown in FIG. 8A. When the user clicks the "NEXT" button, a guidance screen to set the measurement microphone at position of use is displayed, as shown in FIG. 8B. In this case, the sound recognition apparatus in FIG. 6 is realized by the personal computer 20 and the basic microphone #a is set as the stored microphone 21, beside the display monitor, and a message "PLEASE STAY IN FRONT OF MONITOR" is displayed. On the other hand, if the sound recognition apparatus is realized by the desktop personal computer to which the microphone is attached and the attached microphone is set as the basic microphone, another message "PLEASE SET THE MICROPHONE TO YOUR USE POSITION" is displayed. In FIG. 8B, if the user clicks the "NEXT" button, another screen directing the user to repeat a sample word is displayed, as shown in FIG. 8C. In this screen, a first display field 81 indicating the word to be spoken by the user and a second display field 82 indicating the number of words are included. It is desired that the sample words to be spoken by the user consist of a word set that includes various kinds of frequency bands to permit the correct measurement of characteristics of the frequency bands. Therefore, a plurality of word sets are prepared. In case the measurement of the frequency characteristics of the input microphone is executed at plural times, the word set is changed and the user's speech data collected during the previous measurement mode is used to correct the microphone characteristics. In short, speech data is used as much as possible to equalize the elements of each frequency band. As the elements of each frequency band equalize, phoneme balance word set should be selected.

Figure 9A:
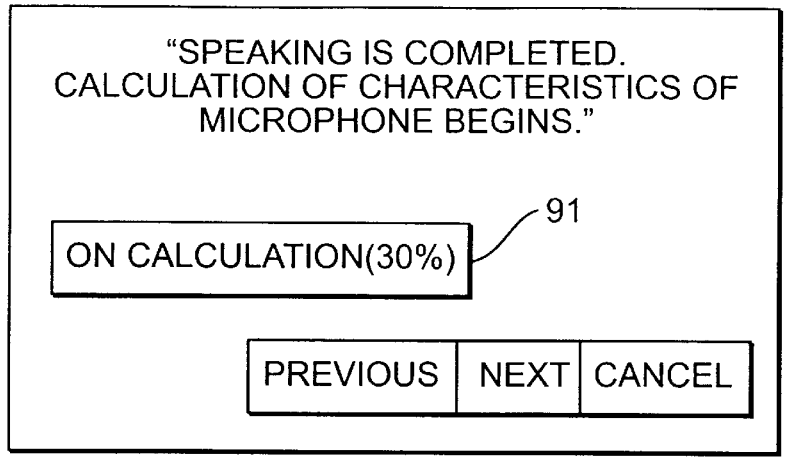
FIGS. 9A, 9B, 9C are schematic diagrams of a guidance screen for the user in case the microphone characteristics calculation mode is set.
Figure 9B:
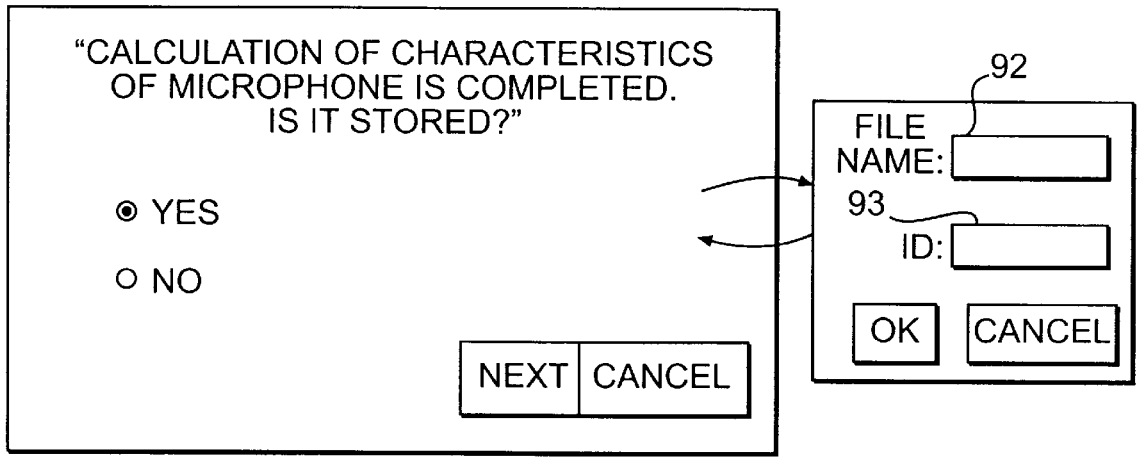
Figure 9C:
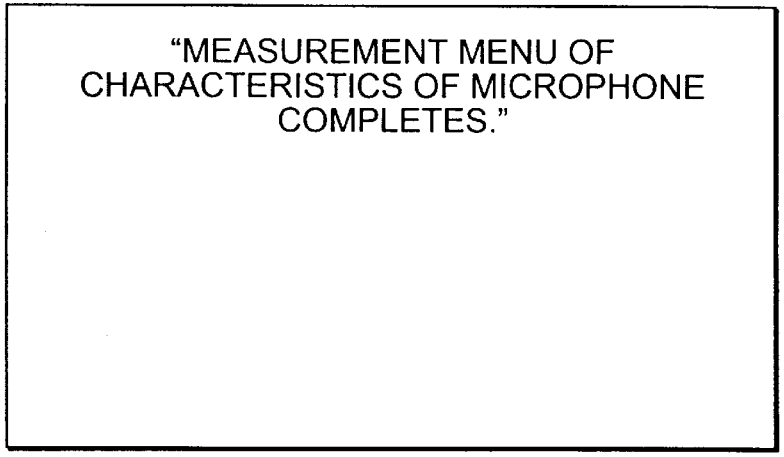

The user speaks the word displayed in the field 81 according to the guidance screen in FIG. 8C. In the sound recognition apparatus in FIG. 6, the processing of the frequency characteristics measurement mode is executed in the same way as the first embodiment. In this case, the processing of following calculation of the average spectral vectors A and B at step S3 in FIG. 3 is not begun until the user has spoken all of the sample words. Time series data of the frequency parameter converted from speech data between the starting point and the ending point is temporarily stored in memory. When the user's speaking of all sample words is completed and he clicks the "NEXT" button, the user interface 61 outputs another guidance screen to inform the user of the calculation of the microphone characteristics through the display 62 as shown in FIG. 9A. The user interface 61 directs the sound analysis section 12 to calculate the average spectral vectors A and B at the same time. The sound analysis section 12 respectively generates the average spectral vectors A and B of the microphones #a and #b according to time series data of the frequency parameter of the input sound from the microphones #a and #b. The processing from the calculation of the frequency parameter of the input microphone #b to storing in the input microphone frequency characteristics memory 15 (step S14~S16 in FIG. 3) is the same as the first embodiment. The user interface 61 detects the progress status of the processing and outputs the progress status as a slide bar field 91 through the display as shown in FIG. 9A. When the calculation of the frequency characteristics of the input microphone #b is completed, the user interface 61 outputs a new screen directing the user to indicate whether to store the microphone characteristics through the display 62 as shown in left side of FIG. 9B. If the user selects "YES", the user interface 61 outputs a new screen consisting of a first field 92 to input the file name and a second field 92 to input ID (identification) for the user to input the file name and ID, as shown in the right side of FIG. 9B. In response to the user's input of the file name and ID, the input microphone frequency characteristics selection section 64 stores the file name and ID with the frequency characteristics Fb in the microphone frequency characteristics memory 63. The ID is additionally displayed in the menu screen shown in FIG. 7 for subsequent sessions. Accordingly, if the user wants to use the same input microphone during the next session, he can select the frequency characteristics of the same input microphone by selecting ID of the same input microphone on the menu screen. Finally, the user interface 61 outputs a new screen through the display 62 to tell the user that all the processings of selecting the microphone characteristics is completed as shown in FIG. 9C.

As mentioned-above, the frequency characteristics of the input microphone selected by the user or calculated at the frequency characteristics measurement mode is stored in the input microphone frequency characteristics memory 15, and the frequency parameter of the input sound from the microphone #b in the recognition mode is corrected to adapt to the frequency characteristics of the dictionary data microphone according to the frequency characteristics Fb stored in the input microphone frequency characteristics memory 15. This processing is the same as steps S15 and 16 in FIG. 4. The recognition section 18 compares the sound feature vector of the corrected characteristics with the recognition dictionary 19 and outputs the word whose similarity is the highest among recognition candidates as a recognition result. The recognition result is supplied to the user interface 61. The user interface 61 directs the display 62 to output the recognition result asking the user to decide whether to make a correction. In case the recognition result is decided to include an error by the user, the display 62 outputs three selection items for the user as follows: (1) the same frequency characteristic Fb of the input microphone #b is used and the user speaks sample words again, (2) another frequency characteristic is selected from the microphone frequency characteristics memory 63, and (3) the frequency characteristics of the input microphone #b is newly measured and stored in the input microphone frequency characteristics memory 15.

In the third embodiment, a plurality of the frequency characteristics of the microphone are previously stored in the microphone frequency characteristics memory 63. One of the plurality of frequency characteristics is selected by the user and stored in the input microphone frequency characteristics memory 15. In this case, as in the above-mentioned processing (S14) of the recognition mode in the first embodiment, it is necessary that the difference between the feature characteristics Fb of the input microphone #b and the feature characteristics Ft of the dictionary data microphone, as well as the correction vector C of the sound data to be recognized, are calculated. Therefore, a plurality of the correction vectors C may be previously calculated by the frequency characteristic Fb of each kind of the input microphone and the frequency characteristics Ft of the dictionary data microphone, and previously stored in the microphone frequency characteristics memory 63. One of the plurality of the correction vectors corresponding to frequency characteristics of user's desired microphone is selected by the input microphone frequency characteristics selection section 64 and stored in the input microphone frequency characteristics memory 15. In this case, in the correction processing of the frequency parameter at the recognition mode, the correction vector C is used as it is, and calculation processing of the correction vector C by the frequency characteristics correction section 16 is unnecessary.

In above-mentioned embodiments, analysis condition such as the frequency parameters are not limited to Fast Fourier Transform. For example, LPC (Linear Predictive Coding) analysis or filter analysis may be used.

What is claimed is:

1. A sound recognition apparatus, comprising:

an input-means for simultaneously inputting speech through a basic microphone of known frequency characteristics and an input microphone of unknown frequency characteristics, the basic microphone being different from a dictionary data microphone of known frequency characteristics which collected data for previously creating a recognition dictionary;

an analysis means for respectively analyzing the frequency of the input speech through the basic microphone and the input microphone;

a frequency characteristics measurement means for calculating as a first difference data, the difference between the frequencies of the input speech of the basic microphone and the input microphone, and for calculating frequency characteristics of the input microphone according to the first difference data and the frequency characteristics of the basic microphone;

a frequency characteristics correction means for calculating as a second difference data, the difference between the frequency characteristics of the input microphone and the known frequency characteristics of the dictionary data microphone which collects data for creating a recognition dictionary, and for correcting input speech to be recognized through the input microphone as speech data of the frequency characteristics of the dictionary data microphone according to the second difference data; and a recognition means for recognizing corrected speech data by referring to the recognition dictionary storing data previously created through the dictionary data microphone.

2. The sound recognition apparatus according to claim 1, wherein said input means respectively extracts speech data between a starting point and an ending point from the input speech through the basic microphone and the input microphone.

3. The sound recognition apparatus according to claim 2, wherein said analysis means calculates average spectral vectors from extracted speech data of the basic microphone and the input microphone.

4. The sound recognition apparatus according to claim 3, wherein said frequency characteristics measurement means calculates the first difference data between the average spectral vector corresponding to input speech of the basic microphone and the average spectral vector corresponding to input speech of the input microphone.

5. The sound recognition apparatus according to claim 1, wherein said frequency characteristics correction means corrects frequency parameter of the input speech to be recognized by unit of predetermined timing as a subtraction between the frequency parameter and the second difference data.

6. The sound recognition apparatus according to claim 5, wherein said frequency characteristics correction means converts the corrected frequency parameter to a speech feature vector to be matched with the recognition dictionary.

7. A sound recognition apparatus, comprising:

a sound output means for outputting sound using previously stored sound waveforms;

an input means for simultaneously inputting sound from said sound output means through a basic microphone of known frequency characteristics and an input microphone of unknown frequency characteristics, the basic microphone being different from a dictionary data microphone of known frequency characteristics which collected data for previously creating a recognition dictionary;

an analysis means for respectively analyzing the frequencies of the input sound through the basic microphone and the input microphone;

a frequency characteristics measurement means for calculating as a first difference data, the difference between the frequencies of the input sound of the basic microphone and the input microphone, and for calculating frequency characteristics of the input microphone according to the first difference data and the frequency characteristics of the basic microphone;

a frequency characteristics correction means for calculating as a second difference data, the difference between the frequency characteristics of the input microphone and the known frequency characteristics of the dictionary data microphone, and for correcting input sound to be recognized through the input microphone as sound data of the frequency characteristics of the dictionary data microphone according to the second difference data; and a recognition means for recognizing corrected sound data by referring to the recognition dictionary storing data previously created through the dictionary data microphone.

8. A method for recognizing sound, comprising the steps of:
- inputting speech through a basic microphone of known frequency characteristics and an input microphone of unknown frequency characteristics simultaneously, the basic microphone being different from a dictionary data microphone of known frequency characteristics which collected data for previously creating a recognition dictionary;
- analyzing the frequencies of the input speech through the basic microphone and the input microphone respectively;
- calculating as a first difference data, the difference between the frequencies of the input speech of the basic microphone and the input microphone;
- calculating frequency characteristics of the input microphone according to the first difference data and the known frequency characteristics of the basic microphone;
- calculating as a second difference data, the difference data between the frequency characteristics of the input microphone and the known frequency characteristics of the dictionary data microphone;
- correcting input speech to be recognized through the input microphone as speech data of the frequency characteristics of the dictionary data microphone according to the second difference data; and
- recognizing corrected speech data by referring to the recognition dictionary storing data previously created through the dictionary data microphone.

9. A method for recognizing sound, comprising steps of:
- outputting sound using previously stored sound waveforms;
- inputting the sound through a basic microphone of known frequency characteristics and an input microphone of unknown frequency characteristics simultaneously, the basic microphone being different from a dictionary data microphone of known frequency characteristics which collected data for previously creating a recognition dictionary;
- analyzing frequencies of the input sound through the basic microphone and the input microphone respectively;
- calculating as a first difference data, the difference between the frequencies of the input sound of the basic microphone and the input microphone;
- calculating frequency characteristics of the input microphone according to the first difference data and the known frequency characteristics of the basic microphone;
- calculating as a second difference data, the difference between the frequency characteristics of the input microphone and the known frequency characteristics of the dictionary data microphone;
- correcting input sound to be recognized through the input microphone as sound data of the frequency characteristics of the dictionary data microphone according to the second difference data; and
- recognizing corrected sound data by referring to the recognition dictionary storing data previously created through the dictionary data microphone.

10. A computer readable memory containing computer readable instructions, comprising:
- an instruction means for causing a computer to receive speech through a basic microphone of known frequency characteristics and an input microphone of unknown frequency characteristics simultaneously, the basic microphone being different from a dictionary data microphone of known frequency characteristics which collected data for previously creating a recognition dictionary;
- an instruction means for causing a computer to respectively analyze the frequency of the input speech through the basic microphone and the input microphone;
- an instruction means for causing a computer to calculate as a first difference data, the difference between the frequencies of the input speech of the basic microphone and the input microphone;
- an instruction means for causing a computer to calculate frequency characteristics of the input microphone according to the first difference data and the known frequency characteristics of the basic microphone;
- an instruction means for causing a computer to calculate as a second difference data, the difference between the frequency characteristics of the input microphone and the known frequency characteristics of the dictionary data microphone;
- an instruction means for causing a computer to correct input speech to be recognized through the input microphone as speech data of the frequency characteristics of the dictionary data microphone according to the second difference data; and
- an instruction means for causing a computer to recognize corrected speech data by referring to the recognition dictionary storing data previously created through the dictionary data microphone.

11. A computer readable memory containing computer readable instructions, comprising:
- an instruction means for causing a computer to output sound using previously stored sound waveform;
- an instruction means for causing a computer to receive the sound through a basic microphone of known frequency characteristics and an input microphone of unknown frequency characteristics simultaneously, the basic microphone being different from a dictionary data microphone of known frequency characteristics which collected data for previously creating a recognition dictionary;
- an instruction means for causing a computer to respectively analyze the frequency of the input sound through the basic microphone and the input microphone;
- an instruction means for causing a computer to calculate as a first difference data, the difference between the frequencies of the input sound of the basic microphone and the input microphone;
- an instruction means for causing a computer to calculate frequency characteristics of the input microphone according to the first difference data and the frequency characteristics of the basic microphone;
- an instruction means for causing a computer to calculate as a second difference data, the difference between the frequency characteristics of the input microphone and the known frequency characteristics of the dictionary data microphone;
- an instruction means for causing a computer to correct input sound to be recognized through the input microphone as sound data of the frequency characteristics of the dictionary data microphone according to the second difference data; and
- an instruction means for causing a computer to recognize corrected sound data by referring to the recognition dictionary storing data previously created through the dictionary data microphone.

* * * * *